US012636885B2

(12) United States Patent
Hosokawa et al.

(10) Patent No.: US 12,636,885 B2
(45) Date of Patent: May 26, 2026

(54) LIQUID EJECTING APPARATUS, IMPRINT APPARATUS, AND CONTROL METHOD

(71) Applicant: CANON KABUSHIKI KAISHA, Tokyo (JP)

(72) Inventors: Takahiro Hosokawa, Tochigi (JP); Hisashi Namba, Tochigi (JP); Noriyasu Hasegawa, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 257 days.

(21) Appl. No.: 18/530,411

(22) Filed: Dec. 6, 2023

(65) Prior Publication Data

US 2024/0198679 A1 Jun. 20, 2024

(30) Foreign Application Priority Data

Dec. 19, 2022 (JP) ................................ 2022-202340

(51) Int. Cl.
*B41J 2/165* (2006.01)
*B41J 2/175* (2006.01)
*B41J 2/185* (2006.01)
*B41J 29/17* (2006.01)

(52) U.S. Cl.
CPC ....... *B41J 2/16517* (2013.01); *B41J 2/17563* (2013.01); *B41J 2/185* (2013.01); *B41J 29/17* (2013.01); *B41P 2235/10* (2013.01); *B41P 2235/31* (2013.01)

(58) Field of Classification Search
CPC ..... B41J 2/16517; B41J 2/17563; B41J 2/185
See application file for complete search history.

(56) References Cited

U.S. PATENT DOCUMENTS

| | | | | |
|---|---|---|---|---|
| 7,490,920 | B2 | 2/2009 | Usuda | |
| 7,950,758 | B2 | 5/2011 | Yoshida | |
| 11,097,545 | B2 | 8/2021 | Iimura et al. | |
| 11,420,438 | B2 | 8/2022 | Nozawa | |
| 2022/0111655 | A1* | 4/2022 | Namba | B41J 2/16508 |

(Continued)

FOREIGN PATENT DOCUMENTS

| | | | |
|---|---|---|---|
| CN | 1644374 | A | 7/2005 |
| CN | 101331023 | A | 12/2008 |
| CN | 112571955 | A | 3/2021 |

(Continued)

OTHER PUBLICATIONS

Office Action in Taiwanese Application No. 112147155 (Nov. 2025).

*Primary Examiner* — Sharon Polk
(74) *Attorney, Agent, or Firm* — VENABLE LLP

(57) ABSTRACT

A liquid ejecting apparatus includes an ejection unit including an ejection surface in which an orifice through which a liquid is ejected is open, an oscillating element provided with the orifice, a retention member arranged opposite the ejection surface and configured to retain a liquid between the retention member and the ejection surface, a detection unit configured to detect an oscillation characteristic of the oscillating element, and a control unit configured to, in a case of cleaning the orifice, drive the oscillating element at a drive period based on a detection result of the detection unit in a state in which the liquid is retained between the retention member and the ejection surface.

9 Claims, 9 Drawing Sheets

(56) References Cited

U.S. PATENT DOCUMENTS

| | | | | |
|---|---|---|---|---|
| 2023/0182473 | A1 * | 6/2023 | Ishida | B41J 2/16508 347/28 |

FOREIGN PATENT DOCUMENTS

| | | | | |
|---|---|---|---|---|
| JP | 2003072077 | A | * | 3/2003 |
| JP | 2017124515 | A | * | 7/2017 |
| JP | 2020-104094 | A | | 7/2020 |

* cited by examiner

LIQUID EJECTING APPARATUS, IMPRINT APPARATUS, AND CONTROL METHOD

BACKGROUND OF THE INVENTION

Field of the Invention

The present invention relates to a liquid ejection technology.

Description of the Related Art

In a liquid ejecting apparatus that ejects a liquid, there is a need for a recovery process such as one for elimination of clogging of an orifice or removal of foreign matter adhering to the periphery of the orifice. Japanese Patent Laid-Open No. 2020-104094 discloses a technique for cleaning an orifice by driving an oscillating element of an ejection head in a state in which a liquid is in contact with an ejection surface. By driving the oscillating element, the liquid flows within and in the periphery of the orifice, and foreign matter such as residue adhering to the inside and on the periphery of the orifice can be removed.

In the technique of Japanese Patent Laid-Open No. 2020-104094, there is room to improve the efficiency in removing foreign matter that firmly adheres to an orifice.

SUMMARY OF THE INVENTION

The present invention provides a technique for improving the efficiency in removing foreign matter adhering to an orifice.

According to one aspect of the invention, there is provided a liquid ejecting apparatus, comprising: an ejection unit including an ejection surface in which an orifice through which a liquid is ejected is open; an oscillating element provided with the orifice; a retention member arranged opposite the ejection surface and configured to retain a liquid between the retention member and the ejection surface; a detection unit configured to detect an oscillation characteristic of the oscillating element; and a control unit configured to, in a case of cleaning the orifice, drive the oscillating element at a drive period based on a detection result of the detection unit in a state in which the liquid is retained between the retention member and the ejection surface.

Further features of the present invention will become apparent from the following description of exemplary embodiments (with reference to the attached drawings).

DESCRIPTION OF THE EMBODIMENTS

Figure 1:
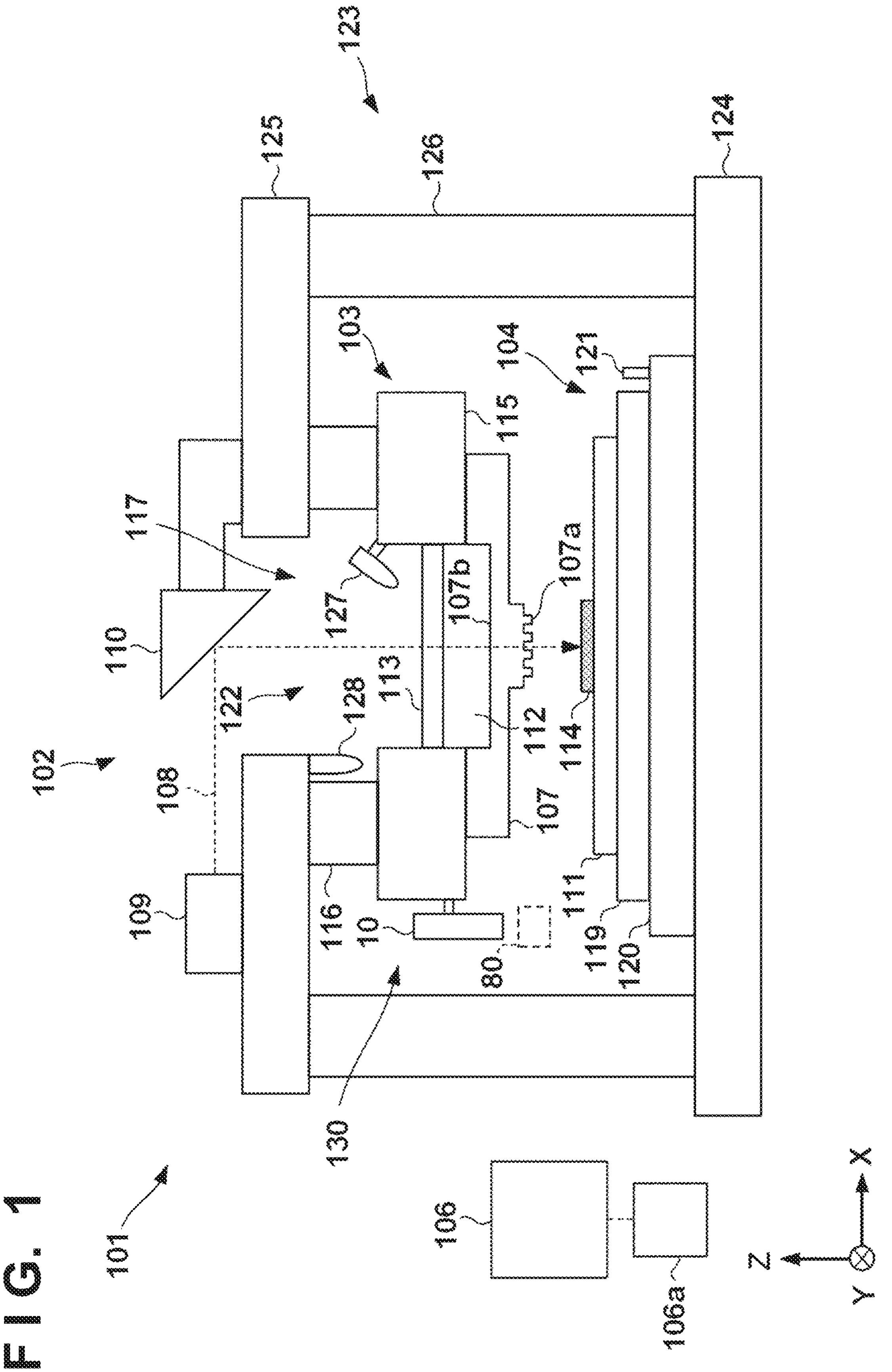
FIG. 1 is a schematic diagram illustrating a configuration of an imprint apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Overview of Imprint Apparatus>

FIG. 1 is a schematic diagram illustrating a configuration of an imprint apparatus 101 according to an embodiment of the present invention. In the drawing, an arrow Z indicates a vertical direction, and arrows X and Y indicate horizontal directions orthogonal to each other. The imprint apparatus 101 is used for manufacturing various devices such as semiconductor devices. The imprint apparatus 101 includes a liquid ejecting apparatus 130. The liquid ejecting apparatus 130 includes a liquid ejecting unit 10 and a recovery unit 80. The liquid ejecting unit 10 ejects a liquid (here, a resist) 114 onto an ejection target (a substrate 111 in the present embodiment). The liquid 114 is, for example, a photocurable resin having a property of being cured by UV light (UV). The liquid 114 is appropriately selected according to various conditions of a semiconductor device manufacturing process or the like. In addition to the photocurable property, for example, a liquid that is a thermosetting resist may be used, and the imprint apparatus may be an apparatus that performs an imprint process by curing the resist with heat. The liquid 114 may be referred to as an ejection material or an imprint material. The recovery unit 80 is used in a recovery process for recovering the ejection performance of the liquid ejecting unit 10. In the case of the present embodiment, the recovery process includes a cleaning process of cleaning the orifice of the liquid ejecting unit 10.

The imprint apparatus 101 also includes a light irradiation unit 102, a mold holding mechanism 103, a substrate stage 104, a control unit 106, a measurement unit 122, and a housing 123.

The light irradiation unit 102 includes a light source 109 and an optical element 110 for correcting an ultraviolet light 108 emitted from the light source 109. The light source 109 is, for example, a halogen lamp that generates an i-line or a g-line. The ultraviolet light 108 is applied to the liquid 114 through a mold 107. The wavelength of the ultraviolet light 108 is a wavelength corresponding to the liquid 114 to be cured. In the case of an imprint apparatus using a thermosetting resist as a resist, a heat source unit for curing the thermosetting resist is installed instead of the light irradiation unit 102.

The mold holding mechanism 103 includes a mold chuck 115 and a mold driving mechanism 116. The mold 107 held by the mold holding mechanism 103 has a rectangular outer peripheral shape, and has a pattern portion 107*a* in which a three-dimensional concavo-convex pattern such as a circuit pattern to be transferred is formed on a surface facing the substrate 111. The material of the mold 107 in the present embodiment is a material capable of transmitting ultraviolet light 108, and quartz is used, for example. The mold chuck 115 holds the mold 107 by vacuum suction or electrostatic force.

The mold driving mechanism 116 moves the mold 107 by holding and moving the mold chuck 115. The mold driving mechanism 116 may move the mold 107 downward in the Z direction to press the mold 107 against the liquid 114. Also, the mold driving mechanism 116 may move the mold 107 upward in the Z direction to pull the mold 107 away from the liquid 114. Examples of an actuator that can be employed in the mold driving mechanism 116 include a linear motor or an air cylinder.

There is an opening region 117 in the center of the mold chuck 115 and the mold driving mechanism 116. The mold 107 has a cavity 107*b* having a concave shape on the surface irradiated with the ultraviolet light 108. A light transmitting member 113 is installed in the opening region 117 of the mold driving mechanism 116, and a sealed space 112 surrounded by the light transmitting member 113, the cavity 107*b*, and the opening region 117 is formed.

The pressure in the space 112 is controlled by a pressure correction apparatus (not illustrated). When the pressure correction apparatus sets the pressure in the space 112 to be higher than the outside, the pattern portion 107*a* is bent in a convex shape toward the substrate 111. As a result, the center portion of the pattern portion 107*a* contacts the liquid 114. Pressing the mold 107 against the liquid 114 prevents gas (air) from being confined between the pattern portion 107*a* and the liquid 114, and the liquid 114 can be filled into all of the concave-convex portions of the pattern portion 107*a*. The depth of the cavity 107*b* that determines the size of the space 112 is changed as appropriate according to the size or material of the mold 107.

The substrate stage 104 includes a substrate chuck 119, a substrate stage housing 120, and a stage reference mark 121. The substrate 111 held by the substrate stage is a single-crystal silicon substrate or a Silicon on Insulator (SOI) substrate, and the liquid 114 is ejected onto the surface of the substrate 111 to be processed to form a pattern.

The substrate chuck 119 holds the substrate 111 by vacuum suction. The substrate stage housing 120 moves the substrate 111 in the X direction and the Y direction while holding the substrate chuck 119 by mechanical means. The stage reference mark 121 is used to set a reference position of the substrate 111 in alignment of the substrate 111 and the mold 107. A linear motor, for example, is used as an actuator of the substrate stage housing 120. The actuator of the substrate stage housing 120 may also include a plurality of drive systems such as a coarse driving system and a fine driving system.

The measurement unit 122 includes an alignment measuring device 127 and a measurement device for observation 128. The alignment measuring device 127 measures positional deviation in the X direction and the Y direction between an alignment mark formed on the substrate 111 and an alignment mark formed on the mold 107. The measurement device for observation 128 is, for example, an image capturing apparatus such as a CCD camera; the measurement device for observation 128 images a pattern of the liquid 114 ejected onto the substrate 111 and outputs it to the control unit 106 as image information.

The control unit 106 controls the entire imprint apparatus 101. The control unit 106*a* is provided in the liquid ejecting apparatus 130 and controls the liquid ejecting apparatus 130. In the operation of the imprint apparatus 101, the control unit 106*a* controls the liquid ejecting apparatus 130 based on a command from the control unit 106.

The control unit 106 includes, for example, a computer having a CPU, a ROM and a RAM. The control unit 106 is connected to each component of the imprint apparatus 101 via a line, and the CPU controls each component in accordance with a control program stored in the ROM. In addition, the control unit 106 includes a display unit and can perform various types of display. The control unit 106 controls operations of the mold holding mechanism 103 and the substrate stage 104 based on measurement information of the measurement unit 122.

A control unit 106*a* includes, for example, a computer having a CPU, a ROM and a RAM. The CPU controls the components of the liquid ejecting apparatus 130 in accordance with a control program stored in the ROM and a command from the control unit 106. Note that configuration may be taken to not have the control unit 106*a* and rather have the control unit 106 control the liquid ejecting apparatus 130.

The housing 123 includes a base plate 124 on which the substrate stage 104 is placed, a bridge plate 125 that fixes the mold holding mechanism 103, and a support column 126 that extends from the base plate 124 and supports the bridge plate 125. The imprint apparatus 101 includes a mold transfer mechanism (not illustrated) that transfers the mold 107 from the outside of the apparatus to the mold holding mechanism 103, and a substrate transfer mechanism (not illustrated) that transfers the substrate 111 from the outside of the apparatus to the substrate stage 104.

The imprint apparatus 101 performs an imprint process including the following series of processes. First, the imprint apparatus 101 causes the liquid ejecting unit 10 to eject the liquid 114 onto the substrate 111. Then, the mold 107, which has a pattern for molding, is pressed against the liquid 114 ejected onto the substrate, and in this state, the liquid 114 is cured by irradiation with light (ultraviolet rays). Thereafter, the pattern of the mold 107 is transferred onto the substrate 111 by separating the mold 107 from the cured liquid 114.

<Liquid Ejecting Unit and Recovery Unit>

Figure 2:
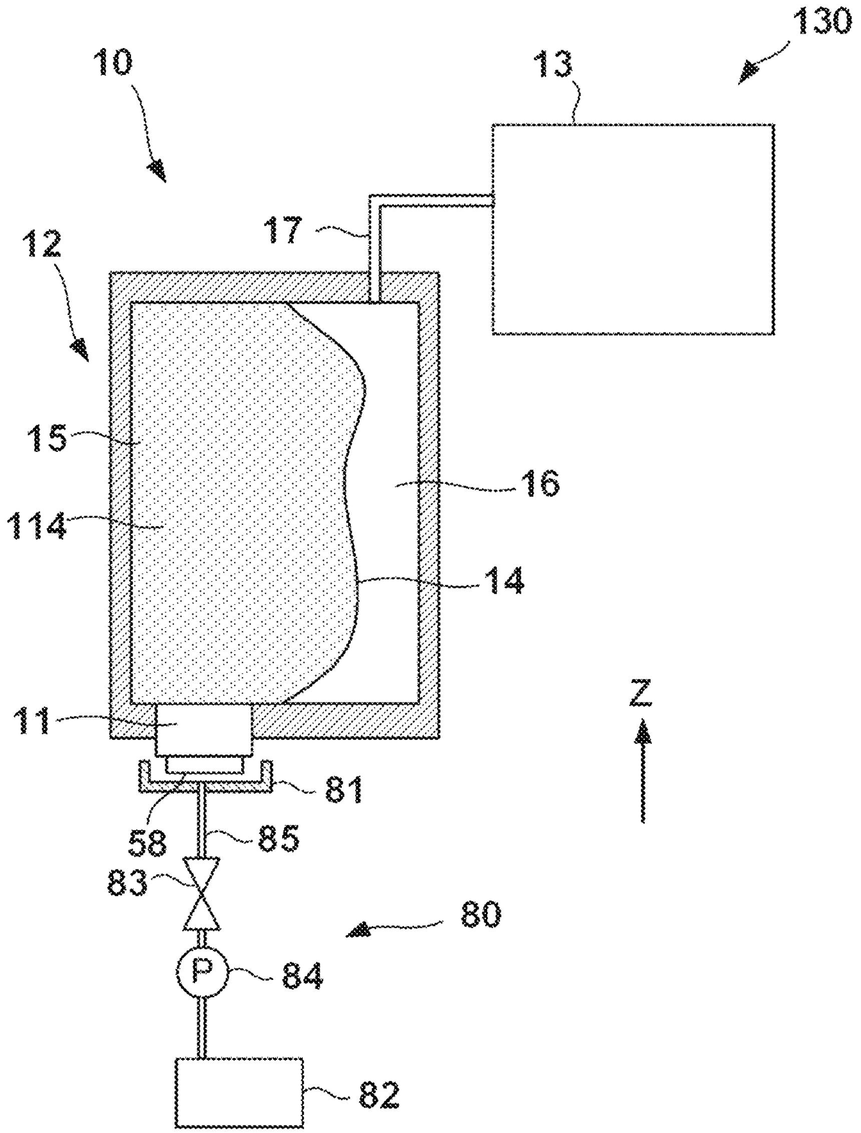
FIG. 2 is a view illustrating a configuration of a liquid ejecting unit and a recovery unit.

FIG. 2 is a diagram illustrating a configuration of the liquid ejecting unit 10 and the recovery unit 80. The liquid ejecting unit 10 includes an ejection head 11, a container 12, and a pressure control unit 13. The container 12 contains the liquid 114. The inner space of the container 12 is partitioned into two spaces by a flexible separation film 14. The liquid 114 is contained in one space 15 in the container, and a filling liquid is contained in the other space 16. The thickness of the separation film 14 is, for example, 10 μm or more and 200 μm or less. The separation film 14 is formed of a material having low permeability to liquids and gases, and can be formed of, for example, a film of a fluoropolymer material such as PFA or a composite multilayer film in which a fluoropolymer material and a plastic material are combined.

The space 16 communicates with the pressure control unit 13 through a connection pipe 17, and the space 15 communicates with the ejection head 11. The pressure control unit 13 includes a tank containing a filling liquid, a pressure sensor, a valve for opening and closing the connection pipe 17, and the like, and is configured to be capable of controlling the pressure in the space 16. By controlling the pressure of the filling liquid in the space 16 by the pressure control unit 13, it is possible to control the pressure of the liquid 114 in the space 15 via the separation film 14. As a result, the shape of the gas-liquid interface in the ejection head 11 can be stabilized, and the liquid 114 can be ejected with high reproducibility.

The recovery unit 80 includes a cap 81 into which waste liquid of the liquid 114 is ejected from the ejection head 11. The cap 81 is a concave member having an opening larger than that of the ejection head 11, and the material thereof is, for example, a PTFE resin cut component for which metal elution is not a concern. The cap 81 may be subjected to acid cleaning, so that it can be used in a physically and chemically clean state. At the time of the recovery process, the cap 81 is disposed so as to face an ejection surface 58 of the ejection head 11. The cap 81 is also used as a retention member that holds the cleaning liquid when cleaning the orifice of the ejection head 11. The cap 81 is arranged to be displaceable in the Z direction by a drive mechanism (not illustrated), and the distance between the cap 81 and the ejection surface 58 can be adjusted.

The recovery unit 80 also includes a waste liquid tube 85, a valve 83 for opening and closing the waste liquid tube 85, a waste liquid collecting container 82, and a pump 84. The waste liquid tube 85 communicates with the cap 81. The pump 84 is a tubing pump that pumps out waste liquid, which is ejected onto the cap 81, to the waste liquid collecting container 82 via the waste liquid tube 85.

Figure 3:
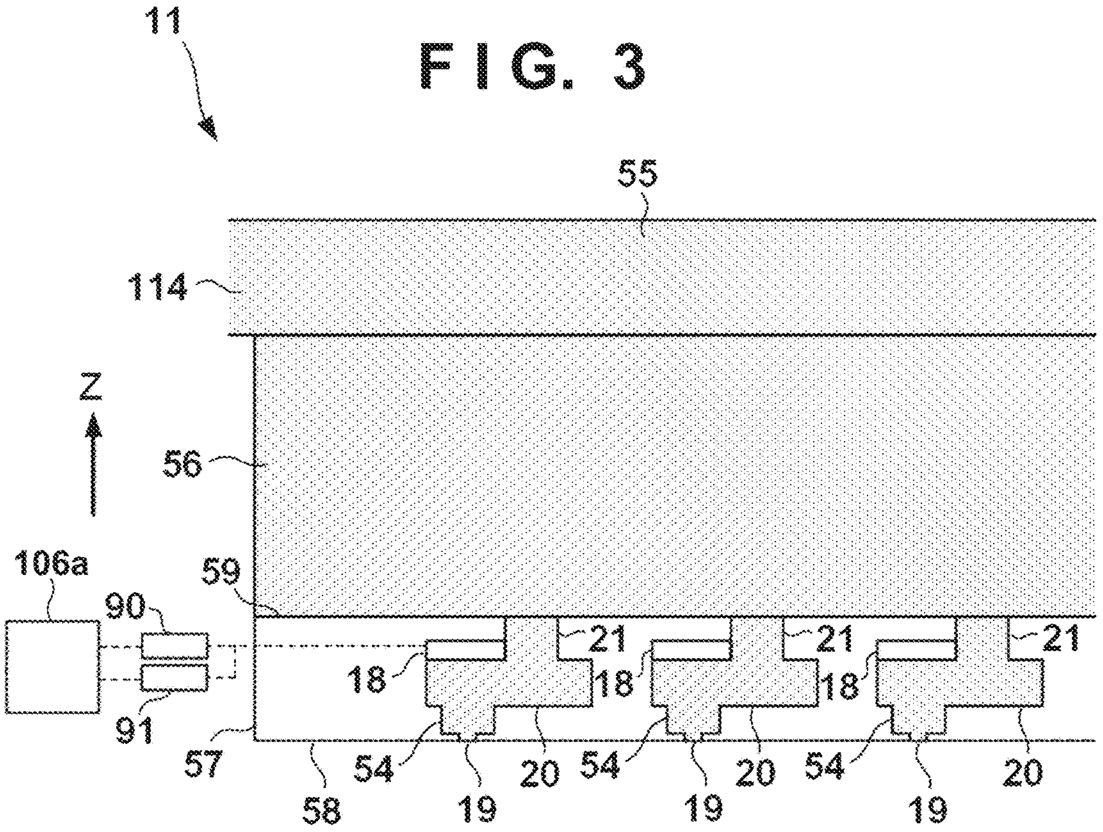
FIG. 3 is a partial enlarged cross-sectional view of an ejection head.

FIG. 3 is a partial enlarged cross-sectional view of the ejection head 11. The ejection head 11 includes a common liquid chamber 56 and a module substrate 57. The module substrate 57 includes a plurality of nozzles 54. Each nozzle 54 is provided with a supply port 21 which opens to an upper surface 59 and takes in the liquid 114, and an orifice 19 which opens to the ejection surface 58 and discharges the liquid 114. An oscillating element 18 that generates energy for ejecting the liquid 114 is provided inside each nozzle 54. The oscillating element 18 is provided for each orifice. The opening area of the orifice 19 is smaller than the opening area of the supply port 21, and has the smallest cross-sectional area in the flow path of the nozzle 54. In the present embodiment, the oscillating element 18 is a piezoelectric device as represented by a piezoelectric element, and hereinafter, the oscillating element 18 may be referred to as the piezoelectric element 18.

The supply port 21 communicates with the orifice 19 through a small liquid chamber 20 inside the module substrate 57. The driving of the piezoelectric element 18 is controlled by the control unit **106*a* via a driving circuit 90. By changing the volume of the small liquid chamber 20 by the piezoelectric element 18, the liquid 114 in the small liquid chamber 20 is ejected from the orifice 19. Note that the ejection head 11** may have a configuration similar to that of an ink ejection head used in an ink jet printer.

Although the ejection head 11 is opened to the atmosphere by the orifice 19, the diameter of the orifice 19 is several μm to several tens of μm, and the liquid 114 does not leak by its own weight due to capillary action. The liquid surface in the vicinity of the orifice 19 is held in a so-called meniscus state having a concave shape. By maintaining the internal pressure of the liquid 114 in the small liquid chamber 20 at a negative pressure of −1000 Pa from −0.1 by the pressure control unit 13, it is possible to stably maintain the meniscus condition. Liquid repellent treatment is applied to the ejection surface 58 to reliably prevent the liquid 114 from leaking from the orifice 19. As the liquid repellent treatment, for example, a fluorine-containing compound is applied to the ejection surface 58 in a film form.

When the diameter of the orifice 19 is a small diameter of several μm to several tens of μm, ejection performance deteriorates when particles adhere to the inside of the orifice 19 or when some of the components contained in the liquid 114 dry and solidify in the periphery of the orifice 19. Examples of deterioration in ejection performance include not only an ejection failure but also variations in ejection amount and ejection direction. When such a decrease in ejection performance occurs, the recovery unit 80 performs a process of recovering the ejection performance.

<Control Example>

Figure 4:
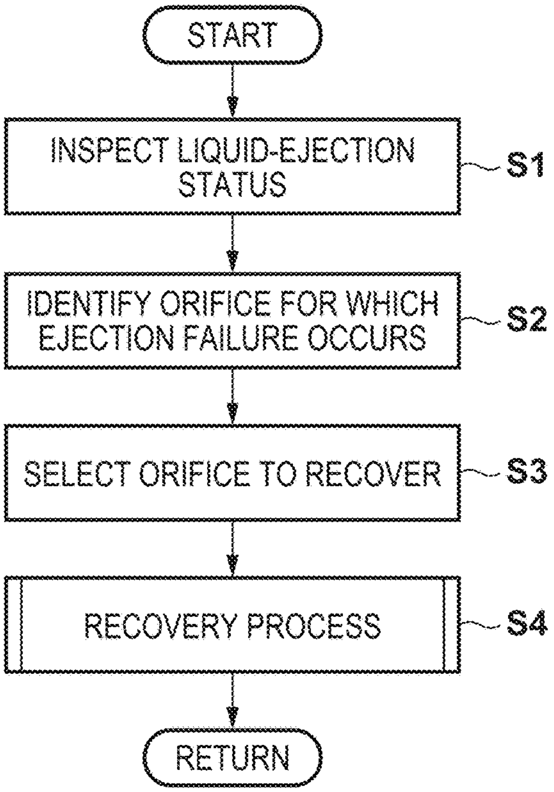
FIG. 4 is a flowchart illustrating an example of control by a control unit.

Referring to FIG. 4, an exemplary process of recovering the ejection head 11 executed by the control unit **106*a* will be described. FIG. 4 is a flowchart illustrating an exemplary process executed by the control unit 106*a*. The illustrated processing is executed at a timing at which the operation for ejecting the liquid 114 to the substrate 111 is not being performed. For example, the following processing is executed after the liquid ejecting apparatus 130** is moved to a standby position for performing maintenance.

In step S1, liquid-ejection status of each orifice 19 is inspected. In step S2, orifices 19 for which ejection failure occurs are identified based on the step S1 inspection results. For example, oscillation characteristics of each piezoelectric element 18 are detected and the inspection of the liquid ejection state is performed based on the detection results. In the present embodiment, a back electromotive force of each piezoelectric element 18 is detected as the oscillation characteristics, and an inspection is performed based on the signal waveform. That is, the piezoelectric element 18 can also be used to detect the liquid ejection state of the orifice 19.

The piezoelectric element 18 is driven by a voltage having an intensity of 30% to 70% of the voltage applied when the liquid 114 is ejected, changing the volume of the small liquid chamber 20 (hereinafter, referred to as inspection oscillation), and applying oscillation to the liquid 114 in the small liquid chamber 20. For example, in the case of applying a driving pulse of ±10V to the piezoelectric element 18 when the liquid 114 is ejected from the orifice 19, a driving pulse of ±6V is applied to the piezoelectric element 18. In other words, the piezoelectric element 18 is driven to an extent that oscillation is applied to the liquid 114 in the small liquid chamber 20 without the meniscus of the orifice 19 being broken and the liquid 114 ejected.

Even when the driving of the piezoelectric element 18 is stopped, a back electromotive force is generated in the piezoelectric element 18 due to the residual oscillation of the liquid 114. The back electromotive force is detected by a sensor 91 provided for each orifice 19. The sensor 91 is, for example, a voltage sensor or a current sensor. When the orifice 19 is blocked by a foreign substance or when bubbles enter the small liquid chamber 20, the waveform of the back electromotive force is different from the standard state (waveform when the meniscus is formed). That is, the piezoelectric element 18 outputs a signal corresponding to the liquid ejection state of the corresponding orifice 19. With this signal, the liquid ejection state of each orifice 19 can be individually detected.

More specifically, the piezoelectric element 18 (piezoelectric element) is deformed by application of a voltage, and this deformation changes the pressure of the liquid 114 in the nozzle 54. When the piezoelectric element 18 is forcibly caused to oscillate, residual oscillation is generated, and back electromotive force is generated by the piezoelectric effect. The sensor 91 detects the back electromotive force generated by the residual oscillation. Further, since the back electromotive force is generated for each piezoelectric element 18, in other words, for each nozzle 54, the sensor 91 detects the back electromotive force for each nozzle 54.

Figure 6A:
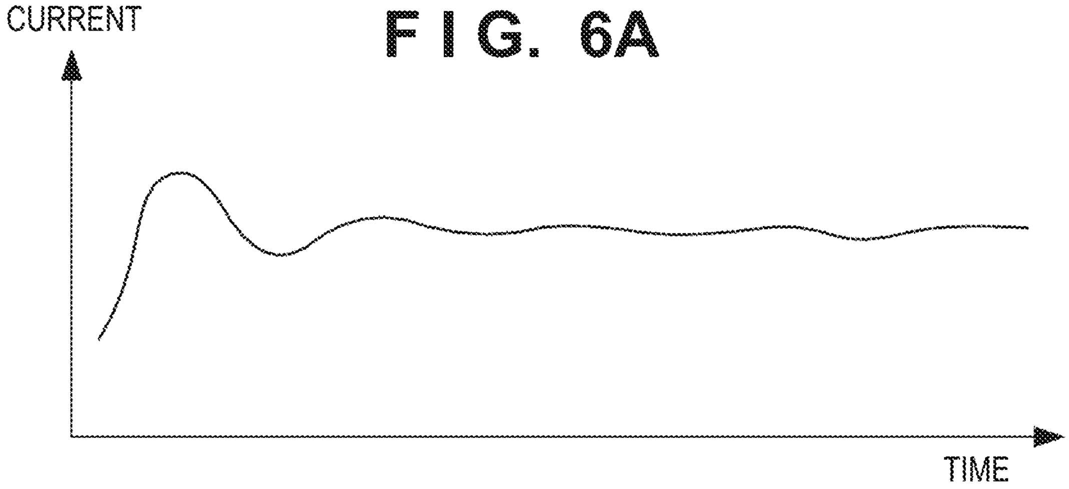
FIG. 6A and FIG. 6B are views illustrating examples of a signal waveform of a back electromotive force.
Figure 6B:
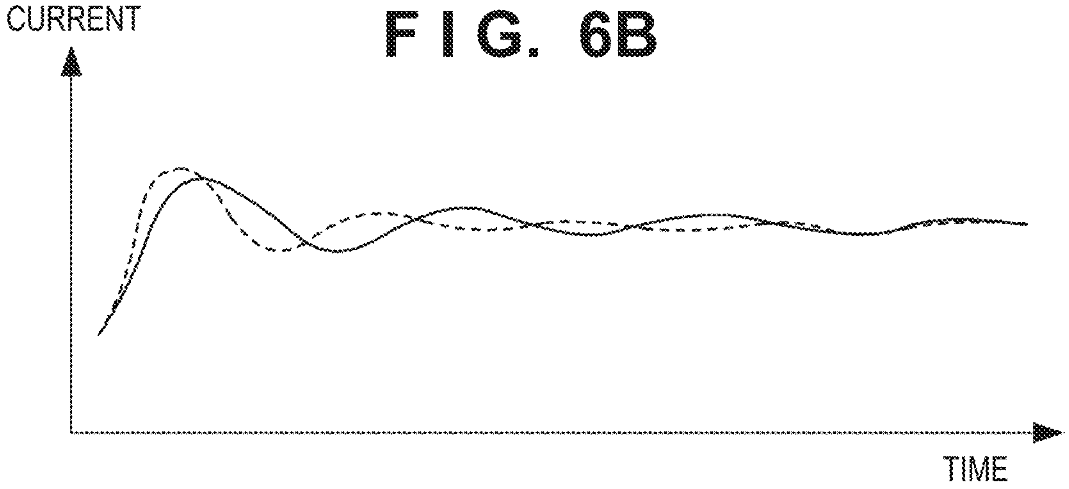
Figure 6C:
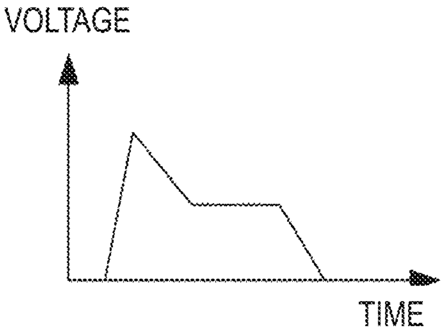
FIG. 6C is a view illustrating an example of an inspection signal.

FIG. 6A and FIG. 6B are diagrams illustrating exemplary signal waveforms (changes in current-time) of the back electromotive force when signal illustrated in FIG. 6C is applied to the piezoelectric element 18 as an inspection signal for inspection oscillation.

The inspection signal of FIG. 6C has, for example, a voltage waveform that varies at less than or equal to the natural period estimated for the piezoelectric element 18. For example, if the natural period of the piezoelectric element 18 is estimated to be 4.5 μsec, a voltage having a waveform that varies within 4.5 μsec is applied.

FIG. 6A is an example of a normal signal waveform in which a decrease in ejection performance does not occur at the orifice 19. A broken line in FIG. 6B is an example of the signal waveform in a normal case, and a solid line is an example of a signal waveform in a case where a decrease in ejection performance occurs. When the meniscus of the liquid 114 ceases to be formed in the orifice 19, the period of the signal is longer (the frequency is smaller) than in the case where the orifice 19 is normal. In addition, the amplitude may be larger.

It is possible to determine a decrease in the ejection performance of the orifice 19 by such a signal waveform difference. It should be noted that the normal signal waveform to be compared can be stored in a storage device such as the ROM of the control unit 106. In addition, instead of storing the signal waveform in a normal state, a threshold value for determining whether or not an ejection failure occurs may be stored. The threshold value may be a threshold value related to the signal period of the back electromotive force or a threshold value related to the signal amplitude.

By such a method, orifices 19 for which ejection failure occurs are identified in step S2 of FIG. 4. When it is determined in step S2 that ejection failure occurs for none of the orifices 19, the process of FIG. 4 is ended.

Here, although the liquid ejection state of the orifice 19 is inspected by inspection oscillation, the orifice 19 (nozzle 54) of the ejection failure may be detected by measuring the presence or absence of landing, the landing position, the speed, and the amount of the landing by a landing inspection device (not illustrated).

In step S3, orifices 19 are selected to be the target of performance recovery based on the identification result of step S2. For example, the orifices 19 identified in step S2 is selected as the orifices 19 to be recovered. As another example, orifices 19 may be grouped according to their positions, and the orifices 19 on which the recovery process is to be performed may be selected on a group-by-group basis. As yet another selection method, the orifices 19 identified in step S2 and orifices 19 within a certain area in the periphery of those orifices may be selected. As yet another example, if there is at least one orifice 19 with an ejection failure in step S2, all the orifices 19 are targeted for recovery.

Figure 5:
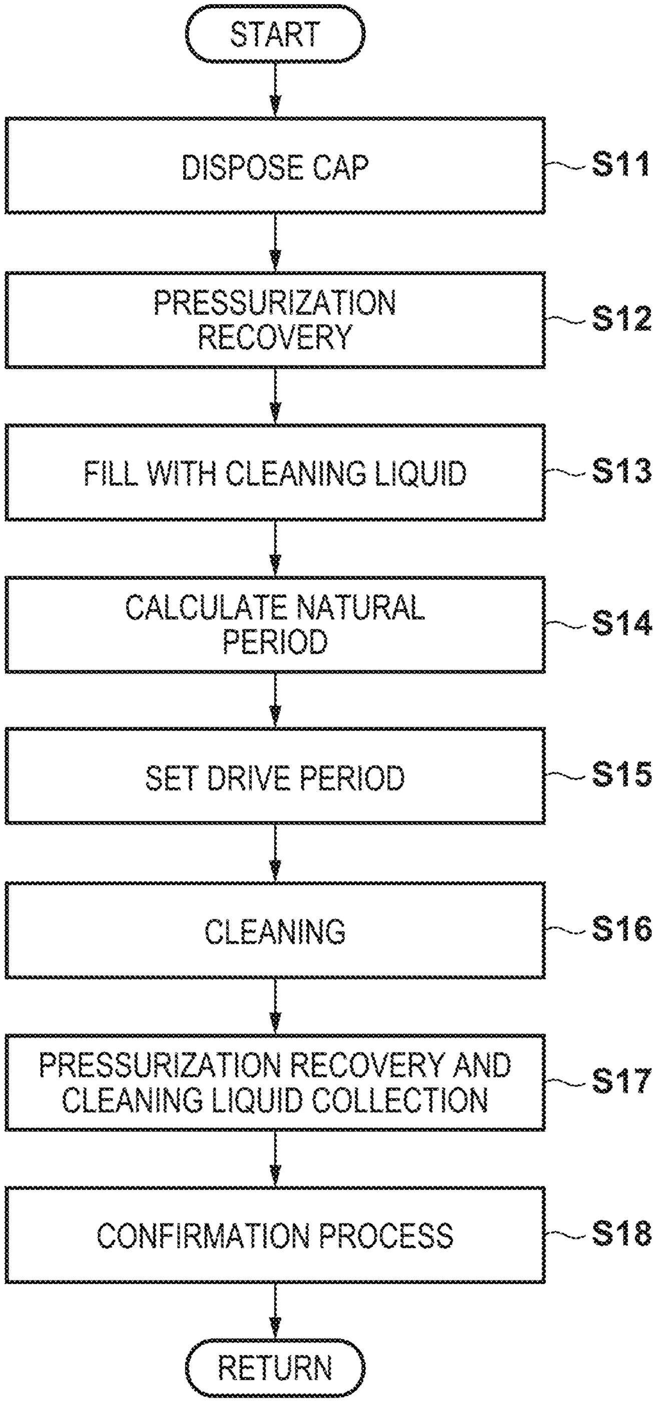
FIG. 5 is a flowchart illustrating an example of control by the control unit.

In step S4, recovery processing is executed for the orifices 19 selected in step S3. FIG. 5 is a flowchart illustrating an exemplary process of step S4.

In step S11, the cap 81 is disposed at a position facing the ejection surface 58. The cap 81 can hold the cleaning liquid between the ejection surface 58 and the inner wall surface of the cap 81. Thereafter, the small liquid chamber 20 corresponding to the orifice 19 selected in step S3 is pressurized by the pressure control unit 13. By pressurizing the small liquid chamber 20 from the +10 kPa to the +50 kPa, for example, it is possible to push out a foreign substance or the like clogged in the orifice 19. At this time, the liquid 114, foreign matter, and the like ejected from the orifice 19 to the cap 81 are discharged to the waste liquid collecting container 82 by the pump 84. Since recovery from the clogging of the orifice 19 may not have been successful even with such pressurization recovery, the process proceeds to the next cleaning step.

In step S13, cleaning liquid is filled between the cap 81 and the ejection surface 58 after the distance between the bottom surface of the cap 81 and the ejection surface 58 is brought within 100 to 500 μm. In the present embodiment, the liquid 114 is used as the cleaning liquid. The pressure of the liquid 114 in the small liquid chamber 20 is set to be equal to or higher than 10 kPa by pressurizing the filling liquid in the space 16 to about 10 kPa to 30 kPa by the pressure control unit 13. As a result, the liquid 14 is ejected as the cleaning liquid from the orifice 19. When the space between the cap 81 and the ejection surface 58 is filled with the liquid 114, the pressurization of the filling liquid in the space 16 is stopped.

Figure 7:
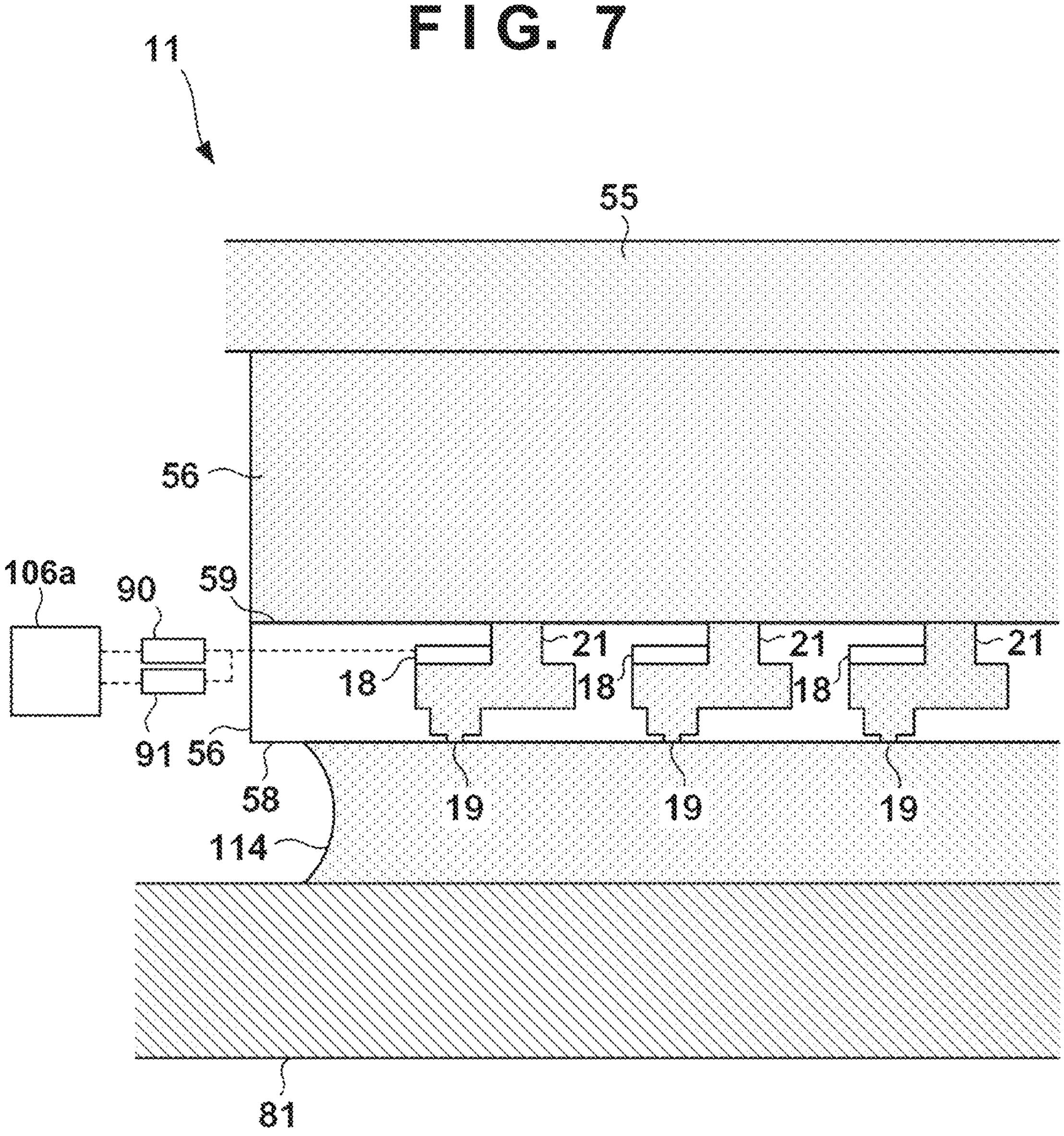
FIG. 7 is a schematic diagram illustrating a state in which a cleaning liquid has been filled between an ejection surface and a cap.

Next, the pressure in the small liquid chamber 20 is set to a slightly positive pressure (several hundred Pa to several kPa) by the pressure control unit 13, and then the pipe 17 connecting the pressure control unit 13 and the space 16 is closed by closing a valve of the pressure control unit 13. Since the liquid 114 on the cap 81 is opened to the atmosphere, the pressure of the liquid 114 in the small liquid chamber 20 gradually decreases from a tiny positive pressure to the atmospheric pressure. This prevents the liquid 114 from flowing out of the ejection head 11 into the cap 81, and prevents the liquid 114 from overflowing from the cap 81. The pressure of the liquid 114 in the small liquid chamber 20 is maintained at a slightly positive pressure from the atmospheric pressure. Therefore, the liquid 114 on the cap 81 is prevented from flowing back to the ejection head 11, and the liquid 114 is retained between the cap 81 and the ejection surface 58 as illustrated in FIG. 7.

Next, in the present embodiment, the cleaning of the orifices 19 selected as the recovery target is performed by physically oscillating the small liquid chamber 20 by driving the corresponding piezoelectric element 18. In step S14 and step S15 of FIG. 5, a process related to setting of a drive period for driving the piezoelectric elements 18 is performed. By resonating the piezoelectric element 18, the cleaning effect is improved.

First, the natural period of the piezoelectric element 18 is identified in step S14. The natural period is identified for each piezoelectric element 18 (for each oscillating element), and the oscillation characteristics of each piezoelectric element 18 are detected and the natural period is identified based on the detection results. The signal waveform of the back electromotive force has already been obtained as the oscillation characteristics of the piezoelectric elements 18 in the inspection of liquid ejection state in step S1. This signal waveform is used to calculate the natural period. The oscillation characteristics of the piezoelectric elements 18 may be detected separately from the step S1 process in order to identify the natural period of the piezoelectric element 18 in step S14. However, according to the present embodiment, the detection of the oscillation characteristics can be performed once for two purposes: inspection of the liquid ejection state and identification of the natural period.

Figure 8A:
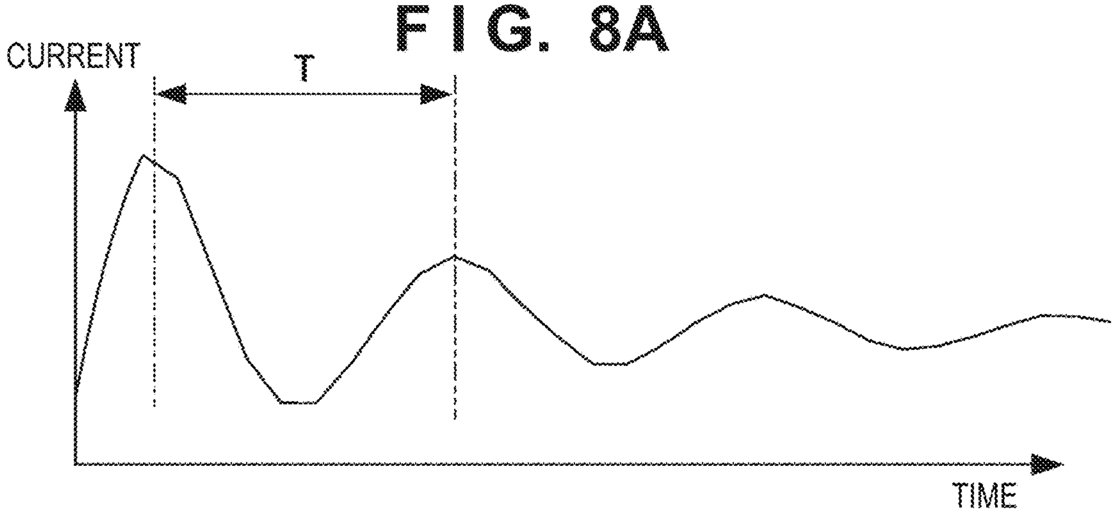
FIG. 8A is a view illustrating an example of a method for identifying a natural period.

In the identification of step S14, the natural period T is calculated from the signal waveform of the back electromotive force of the piezoelectric element 18. FIG. 8A illustrates an example thereof. The signal waveform of the back electromotive force is a residual oscillation generated after the oscillation of the piezoelectric element 18, and thus becomes a damping wave. The natural period T is calculated by fitting the signal waveform with a damping wave function.

Figure 8B:
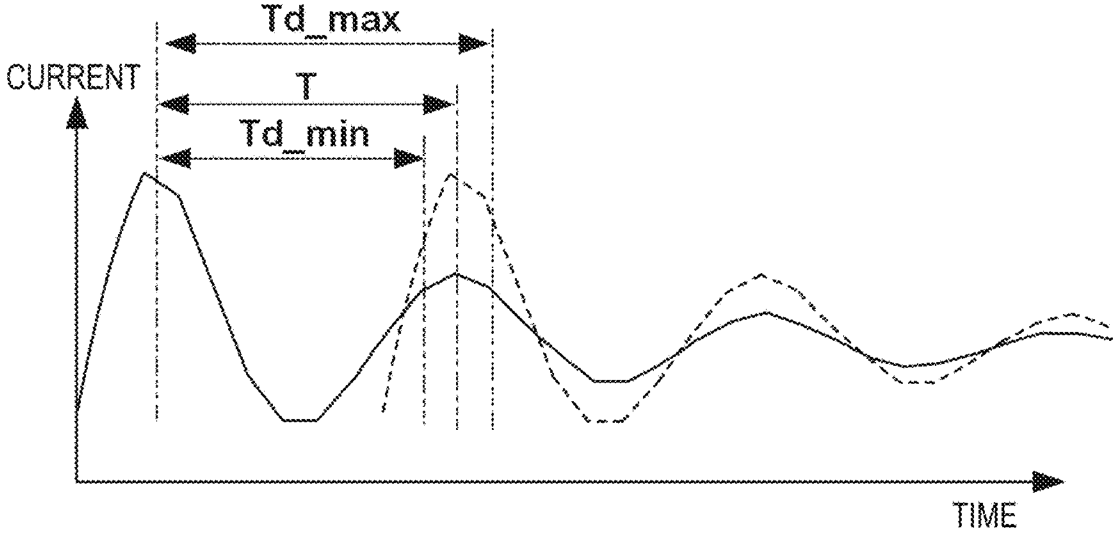
FIG. 8B is a view illustrating an example of a method for setting a drive period.

In step S15, a drive period of the piezoelectric element 18 is set based on the natural period T calculated in step S14. FIG. 8B illustrates a signal waveform (dotted line) obtained when the piezoelectric element 18 is driven after a delay of the natural period T from the signal waveform (solid line) of the back electromotive force generated in the piezoelectric element 18. The dotted line in FIG. 8B indicates that the piezoelectric element 18 is caused to oscillate at a period of 1 times the natural period T. The second peak of the waveform of the solid line when the piezoelectric element 18 is first driven and the first peak of the waveform of the dotted line when the piezoelectric element 18 is driven overlap with a delay of one times of the natural period T. As a result, the piezoelectric element 18 resonates, the oscillation of the piezoelectric element 18 increases, and the fluidity of the liquid 114 in contact with the ejection surface 58 increases. Foreign matter adhering to the inside or the periphery of the orifice 19 is effectively removed.

Therefore, by setting the drive period Td to the natural period T, the cleaning effectiveness can be improved. However, the oscillation period Td of the piezoelectric element 18 need not be exactly the same as the natural period T to have a cleaning effect, and may be a period within a certain range with respect to the natural period T. Assuming that the minimum period of the drive period Td is Td_min and the maximum period is Td_max, the drive period Td is calculated as follows:

$$Td\_\mathrm{min} \le Td \le Td\_\mathrm{max} \quad \text{(Expression 1)}$$

As an example, Td_min=T, Td_max=T+T×0.2. For example, when the natural period T of the piezoelectric element 18 is 4.5 μsec, the drive period Td is 4.5 μsec≤Td≤5.4 μsec. When the drive period Td is expressed by the driving frequency fd, it is 185 KHz≤fd≤222 KHz.

In the orifices 19 (the nozzles 54) for which ejection failure occurs, the natural period T of the piezoelectric element 18 may be longer than the natural period T in the normal state by a few percent to about 30 percent. In addition, the natural period T may be different depending on a degree of the amount of the deposit with respect to the orifice 19 or the like. In the present embodiment, the natural period T is calculated for each piezoelectric element 18, and the drive period Td is set for each piezoelectric element 18. Therefore, a cleaning effect suitable for each orifice 19 can be obtained. However, the same drive period Td can be set for all of the piezoelectric elements 18. In this case, the drive period Td may be set based on the natural period T of any one of the piezoelectric elements 18, or the drive period Td may be set based on the average value of the natural periods T of the plurality of piezoelectric elements 18.

In step S16 of FIG. 5, the orifice 19 is cleaned. Here, the piezoelectric element 18 is driven at the drive period Td set in step S15 while the liquid 114 is retained between the ejection surface 58 and the cap 81. The orifice 19 (nozzle 54) is cleaned by the physical oscillation of the small liquid chamber 20 generated by the piezoelectric element 18 and the flow of the liquid 114 generated by the oscillation.

Figure 9:
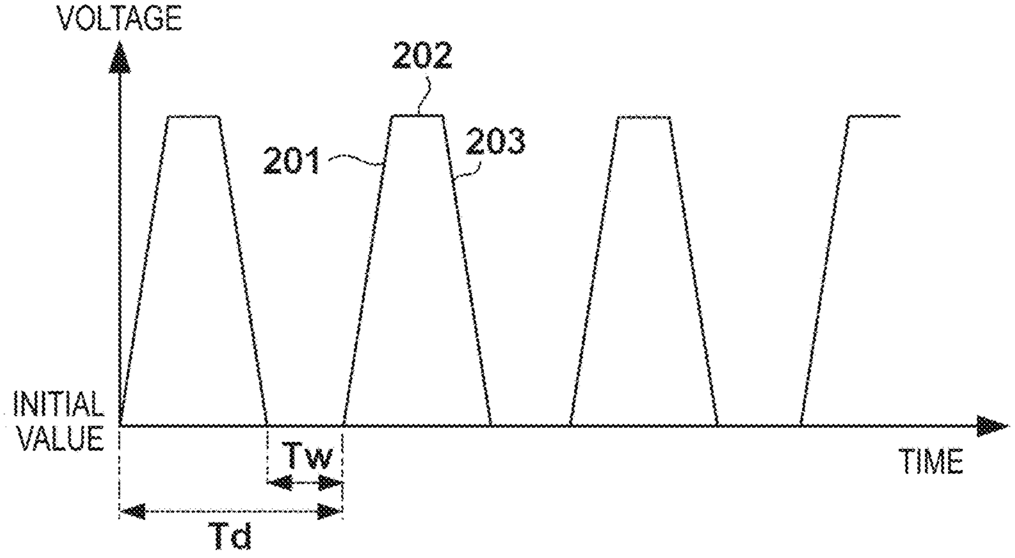
FIG. 9 is a view illustrating an example of a drive signal.

FIG. 9 illustrates the waveform of the drive signal applied to the piezoelectric element 18. The horizontal axis represents time, and the vertical axis represents voltage. The drive signal illustrated is a trapezoidal wave as an example. The trapezoidal wave includes a pull component (rising edge) 201, a constant voltage component 202, and a push component (falling edge) 203. The drive period Td is the sum of the time of the trapezoidal wave and the waiting period Tw at its initial value.

With this trapezoidal wave, by the first pull component 201, the liquid 114 in the cap 81 flows into the orifice 19. After the pull component 201, the voltage is kept constant by the constant voltage component 202. During this time, the liquid flowing from the cap 81 into the orifice 19 decreases. In the subsequent push component 203, the liquid 114 in the orifice 19 is pushed out into the cap 81. Thereafter, less and less liquid 114 is pushed out from the orifice 19 into the cap 81 in the waiting period Tw at the initial value, and the liquid 114 in the cap 81 again flows into the orifice 19 at the subsequent trapezoidal wave.

In the cleaning operation, since the liquid 114 only needs to move in and out between the cap 81 and the inside of the orifice 19, the waveform for driving the piezoelectric element 18 in the cleaning operation may include at least the pull component 201 for increasing the voltage and the push component 203 for decreasing the voltage. FIG. 9 describes a trapezoidal wave, but a cleaning effect can similarly be achieved using a square wave, a saw wave, a triangular wave, and a pulse wave also.

For example, in the case where the maximum drive frequency during the imprint operation is 60 KHz, the drive signal can be realized by adding a plurality of drive signals during that period. In other words, the number of drive signals per unit time may be different between the case where the liquid is ejected from the orifice 19 to the substrate 111 and the case where the orifice 19 is cleaned. As a result, as illustrated in FIG. 9, the number of drive signals (trapezoidal waves) and the waiting period Tw can be adjusted, and the piezoelectric elements 18 can be driven at a desired oscillation period Td of the drive waveform.

The voltage of the drive signal at the time of cleaning may be about 20% to 40% larger than the voltage applied to the piezoelectric element 18 at the time of ejection in the imprint operation. The cleaning effect can be further enhanced.

When the piezoelectric elements 18 are driven in the drive period Td at the time of cleaning, the load of the driving circuit 90 may be increased. Therefore, a driving time and a drive stoppage time of the driving element 18 may be alternately set, and the cleaning may be repeatedly performed in short periods with intervals in between.

By not driving the piezoelectric element 18 for the orifices 19 that are not targeted for recovery processing, it is possible to prevent contaminants from flowing into the orifice 19 and prevent secondary contamination.

After the cleaning ends, in step S17 of FIG. 5, the gap between the cap 81 and the ejection surface 58 is widened. Then, in order to replace the liquid 114 in the ejection head 11, the liquid 114 is discharged from the orifices 19 into the cap 81 in the same manner as in the pressurization recovery process of step S12. As a result, it is possible to prevent foreign matter from entering the orifice 19 again. Thereafter, the pump 84 is driven to discharge the liquid 114 between the ejection surface 58 and the cap 81.

The ejection surface 58 of the ejection head 11 may be cleaned using a suction nozzle (not illustrated). Cleaning is performed by sucking and removing the cleaning liquid (the liquid 114) adhering to the ejection surface 58. Suction is started after the suction nozzle directly connected to the negative pressure source is brought within 100 μm of the ejection surface 58 of the ejection head 11, and the suction nozzle is scanned against the ejection surface 58 to suck out the liquid droplets remaining on the surface of the ejection surface 58 while maintaining a distance from the ejection surface 58. The suction opening gap of the suction nozzle is set at 100 μm to 200 μm. The remaining droplets may momentarily bring the ejection surface 58 and the tip of the suction nozzle into a conducting state with the liquid 114. A PTFE resin suction nozzle may be used to prevent the risk of metallic contamination.

In step S18, a confirmation process is performed. Here, a similar inspection to step S1 is performed again, and inspection oscillations are performed again to confirm whether or not there is an orifice 19 in which ejection failure occurs, just in case. If there is an orifice 19 in which ejection failure occurs, the recovery process (S4) is performed again. In the event of secondary contamination, such contamination can be eliminated. If there is no orifice 19 in which ejection failure occurs, the process ends.

In the present embodiment, the liquid ejecting apparatus 130 is mounted on the imprint apparatus 101, inspection oscillation of the ejection unit 11 is performed, and the natural period T of the piezoelectric element 18 is calculated from the oscillation characteristic obtained by the inspection oscillation to set the oscillation period Td of the piezoelectric element 18 in the cleaning operation. However, prior to mounting the liquid ejecting apparatus 130 in the imprint apparatus 101, inspection oscillation may be performed and the oscillation period Td of the piezoelectric element 18 used in the cleaning operation may be set in advance.

Second Embodiment

When the drive period Td is short, the load on the driving circuit 90 is heavy. On the other hand, the longer the cleaning time by oscillation of the piezoelectric element 18 is continuously performed, the greater the effect is. By performing such cleaning for several hours to several days, even tenacious foreign matter can be removed. In the present embodiment, cleaning is performed by driving the piezoelectric element 18 at a lower driving frequency than in the first embodiment.

When the piezoelectric element 18 is oscillated at a period of a natural number times the natural period T of the piezoelectric element 18 during cleaning, the piezoelectric element 18 resonates and the oscillation of the piezoelectric element 18 increases. By increasing the fluidity of the liquid 114 in contact with the ejection surface 58, the cleaning effect can be improved.

Figure 10A:
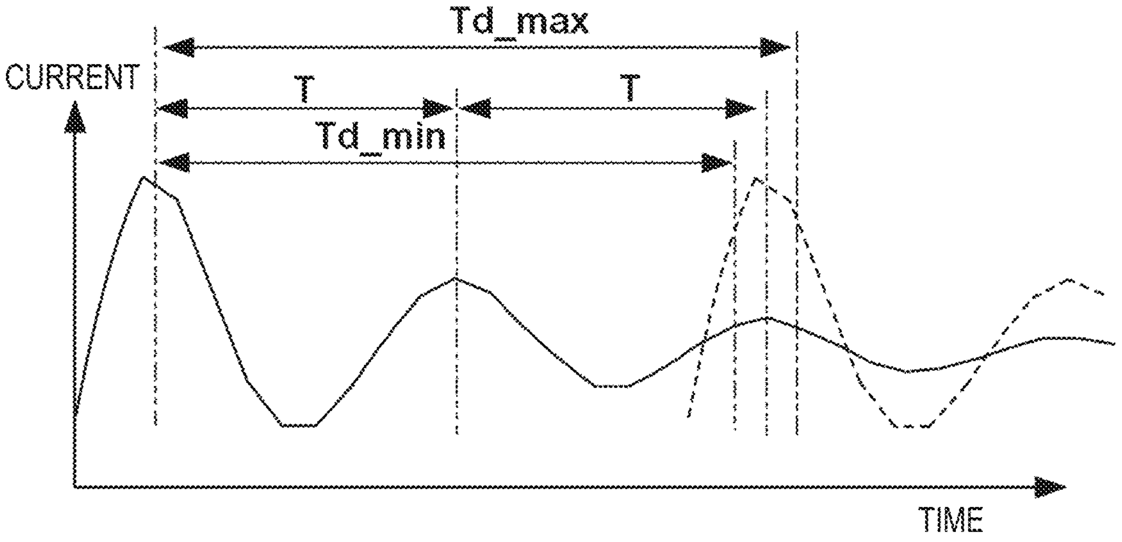
FIG. 10A is a view illustrating an example of another method for setting a drive period.

FIG. 10A illustrates a signal waveform (dotted line) obtained when the piezoelectric element 18 is driven after a delay of two times the natural period T from the signal waveform (solid line) of the back electromotive force generated in the piezoelectric element 18. That is, the dotted line in FIG. 10A indicates that the piezoelectric element 18 is caused to oscillate at a period of 2 times the natural period T. The third peak of the waveform of the solid line when the piezoelectric element 18 is first driven and the first peak of the waveform of the dotted line when the piezoelectric element 18 is driven with a delay of two times of the natural period T overlap. As a result, the piezoelectric element 18 resonates, the oscillation of the piezoelectric element 18 increases, and the fluidity of the liquid 114 in contact with the ejection surface 58 increases. Foreign matter adhering to the inside or the periphery of the orifice 19 is effectively removed.

Therefore, by setting the drive period Td to 2 or more times the natural period T, the cleaning effectiveness can be improved. However, the oscillation period Td of the piezoelectric element 18 need not be exactly the same as two or more times the natural period T to have a cleaning effect, and may be a period within a certain range with respect to the natural period T. Assuming that a multiple of the drive period Td of the piezoelectric element with respect to the natural period T is (a natural number of 2 or more), the minimum period of the drive period Tdn is Tdn_min, and the maximum period is Tdn_max, the drive period Tdn can be expressed as:

$$Tdn\_\text{min} \leq Tdn \leq Tdn\_\text{max} \quad \text{(Expression 2)}$$

($n$ is a natural number of 2 or more)

Figure 10B:
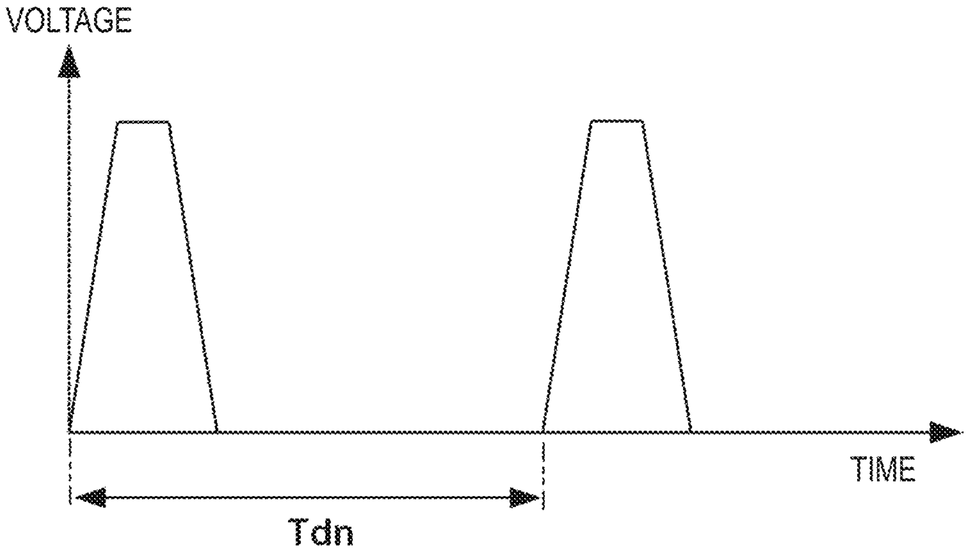
FIG. 10B is a view illustrating an example of a drive signal.

As an example, Tdn_min=n×T−(T×0.2) and Tdn_max=n×T+(Tx×0.2). FIG. 10B illustrates the waveform of the drive signal applied to the piezoelectric element 18. The horizontal axis represents time, and the vertical axis represents voltage. Similarly to the example of FIG. 9, the drive signal illustrated is a trapezoidal wave as an example.

In a case where the multiple n=2, when the natural period T of the piezoelectric element 18 is 4.5 μsec, the drive period Td2 is 81 μsec≤Td2≤9.9 μsec. When the drive period Td2 is expressed by the driving frequency f2, it is 101 KHz≤f2≤123 KHz.

When the value of the multiple n increases, the drive period Tdn increases, and consequently, the flow of the liquid 114 becomes weaker between drivings of the piezoelectric element 18, which may reduce the cleaning effectiveness. In this respect, the multiple n may be a natural number equal to or less than 7.

Third Embodiment

Figure 11:
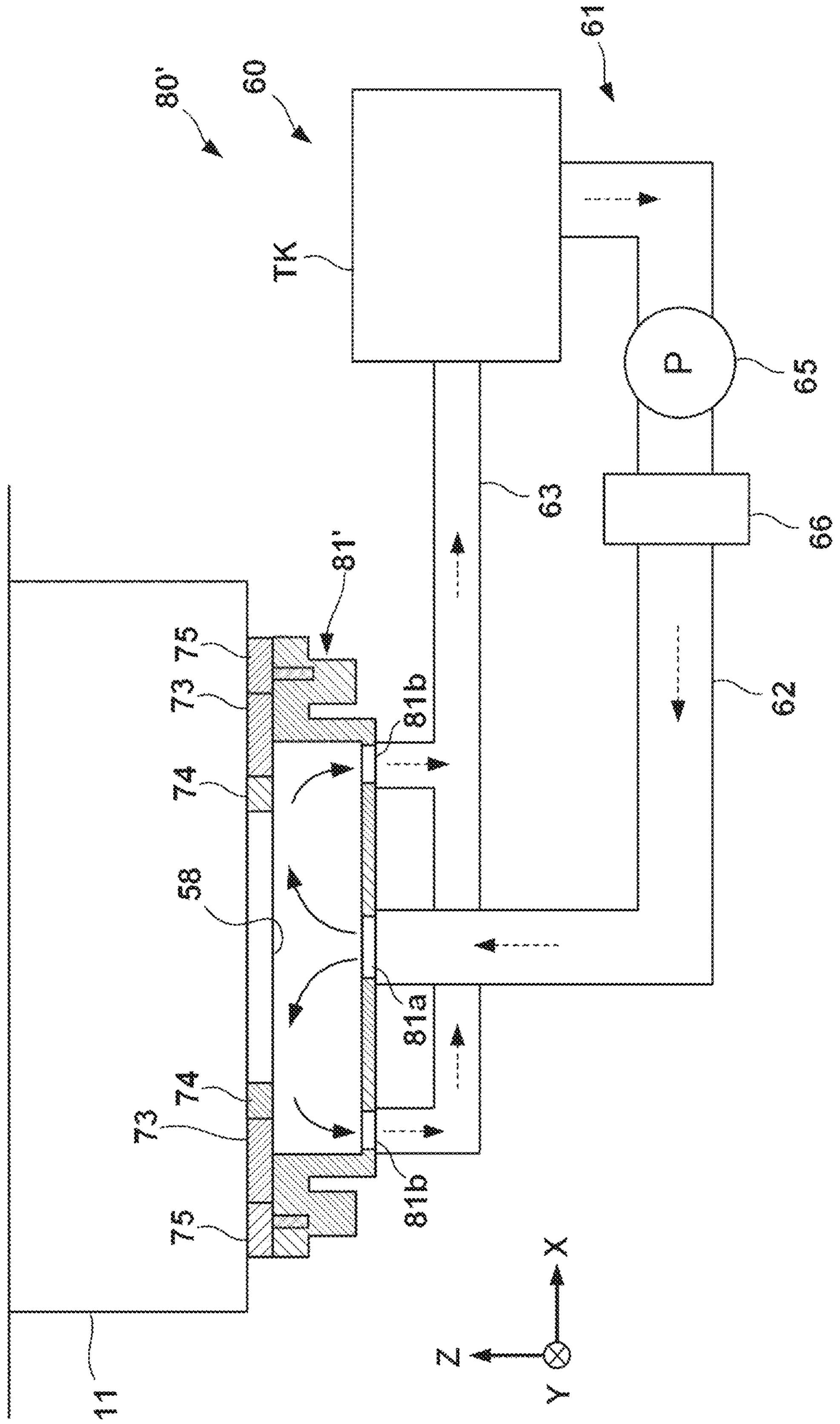
FIG. 11 is a view for describing a configuration for circulating a cleaning liquid.

During cleaning, the liquid 114 between the ejection head 10 and the cap 81 may be circulated while being filtered. FIG. 11 is a diagram illustrating a configuration example of the present embodiment. A recovery unit 80' comprises a cleaning apparatus 60. The cleaning apparatus 60 is an apparatus that cleans each orifice 19 with a cleaning liquid, and includes a circulation apparatus 61, a cap 81' instead of the cap 81, and a filter 66. The cleaning liquid is, for example, a liquid similar to the liquid 114, or a liquid using one of the materials contained in the liquid 114. A plurality of types of cleaning liquids may be used for a single cleaning, and for example, after cleaning using a liquid different from the liquid 114 as a cleaning liquid, cleaning may be performed using the liquid 114 as a cleaning liquid.

The cap 81' is detachably attached to the ejection head 11. The circulation apparatus 61 is a mechanism for circulating the cleaning liquid supplied to and discharged from the cap 81'. The filter 66 is provided in the middle of the circulation path in the cleaning liquid, and purifies the cleaning liquid. By circulating the cleaning liquid, the amount of the cleaning liquid consumed can be reduced.

The circulation apparatus 61 includes a container TK for storing the cleaning liquid, pipes 62 and 63, and a pump 65. The pipe 62 connects the container TK and the cap 81' to form a flow path for supplying the cleaning liquid. The pipe 63 connects the container TK and the cap 81' to form a flow path for discharging (recovery side) the cleaning liquid. In the present embodiment, the pump 65 is provided in the middle of the pipe 62, and pumps the cleaning liquid to the cap 81'. The filter 66 is provided in the middle of the pipe 62 and downstream of the pump 65, and purifies the cleaning liquid flowing through the pipe 62. Even if debris generated by the pump 65 is mixed into the cleaning liquid, the debris is removed by the filter 66.

A tile 75 is provided on the bottom surface of the ejection head 11. The tile 75 holds the ejection surface 58 on which the plurality of orifices 19 are formed, a protective member 73 that protects the ejection surface 58, and a filler 74 that fills a gap between the ejection surface 58 and the protective member 73.

The cap 81' is a member that forms a holding space for the cleaning liquid inside so that the cleaning liquid comes into contact with the ejection surface 58. The cap 81' is, for example, a PTFE resin cut component for which metal elution is not a concern. The cap 81' can be used in a physically and chemically clean state by performing acid cleaning on the cap 81' after the process molding.

A feed port 81*a* and a plurality of discharge ports 81*b* are formed in the cap 81'. The feed port 81*a* is connected to the pipe 62, and the plurality of discharge ports 81*b* are connected to the pipe 63. The cleaning liquid pumped from the pump 65 is supplied to the cap 81' through the feed port 81*a* and discharged from the cap 81' through the plurality of discharge ports 81*b*.

The pressure (P1) of the cleaning liquid pumped into the cap 81' can be measured by a pressure gauge (not illustrated) included in the pump 65. By controlling the pressure (P2) inside the ejection head 11 by a pressure control apparatus 13, the magnitude relation between the pressure P1 and the pressure P2 can be controlled.

Also in the case of the present embodiment, the orifice 19 can be cleaned by the processing procedure illustrated in FIG. 4 and FIG. 5 of the first embodiment. When the cleaning liquid is filled between the cap 81' and the ejection surface 58 in step S13 of FIG. 5, the cleaning liquid stored in the container TK can be used. In this case, the pump 65 is driven to supply the cleaning liquid into the cap 81'.

During cleaning, the piezoelectric element 18 is driven in a drive period Td, while the pump 65 is driven to circulate the cleaning liquid between the cap 81' and the container TK. The circulation of the cleaning liquid can enhance the flow of the cleaning liquid in the periphery of the orifice 19. Foreign matter separated from the periphery of the orifice 19 by the driving of the piezoelectric element 18 reaches the filter 66 by the action of the circulation apparatus 61 and is captured. Since the cleaning liquid is purified by the filter 66, the cleaning liquid can be repeatedly used, and the amount of the cleaning liquid consumed can be suppressed even when cleaning is performed for a long time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-202340, filed Dec. 19, 2022, which is hereby incorporated by reference herein in its entirety.

What is claimed is:

1. A liquid ejecting apparatus, comprising:

an ejection unit including an ejection surface in which an orifice through which a liquid is ejected is open;

an oscillating element provided with the orifice;

a retention member arranged opposite the ejection surface and configured to retain a liquid between the retention member and the ejection surface;

a detection unit configured to detect an oscillation characteristic of the oscillating element; and a control unit configured to identify a natural period of the oscillating element based on a detection result, and configured to, in a case of cleaning the orifice, drive the oscillating element at a drive period based on the natural period in a state in which the liquid is retained between the retention member and the ejection surface, wherein letting the natural period be T and the drive period be Td, $$T \le Td \le T \times 1.2.$$

2. The liquid ejecting apparatus according to claim 1, wherein a plurality of orifices are open in the ejection surface, wherein the oscillating element is provided with each of the plurality of orifice, and wherein the control unit is configured to, for each said oscillating element, identify the natural period and set the drive period.

3. The liquid ejecting apparatus according to claim 1, comprising a collection container configured to collect the liquid retained between the ejection surface and the retention member.

4. The liquid ejecting apparatus according to claim 1, comprising a circulation unit configured to cause a liquid to circulate via a filter between a container and a space which is between the ejection surface and the retention member.

5. The liquid ejecting apparatus according to claim 1, wherein the oscillating element is a piezoelectric element disposed in a liquid chamber that communicates with the orifice, and the detection unit is configured to detect a back electromotive force that the piezoelectric element outputs due to oscillation of a liquid in the liquid chamber by driving of piezoelectric element.

6. The liquid ejecting apparatus according to claim 5, wherein the control unit is configured to perform:

an inspection of an ejection state of the orifice based on a signal waveform of the back electromotive force; and setting of the drive period based on the signal waveform of the back electromotive force.

7. A liquid ejecting apparatus, comprising:

an ejection unit including an ejection surface in which an orifice through which a liquid is ejected is open;

an oscillating element provided with the orifice;

a retention member arranged opposite the ejection surface and configured to retain a liquid between the retention member and the ejection surface;

a detection unit configured to detect an oscillation characteristic of the oscillating element; and a control unit configured to identify a natural period of the oscillating element based on a detection result, and configured to, in a case of cleaning the orifice, drive the oscillating element at a drive period based on the natural period in a state in which the liquid is retained between the retention member and the ejection surface, wherein letting the natural period be T and the drive period be Td, $$(n \times T - T \times 0.2) \leq Td \leq (n \times T + T \times 0.2),$$

where n is a natural number 2 or higher.

8. A liquid ejecting apparatus comprising:

an ejection unit including an ejection surface in which an orifice through which a liquid is ejected is open;

an oscillating element provided with the orifice;

a retention member arranged opposite the ejection surface and configured to retain a liquid between the retention member and the ejection surface;

a detection unit configured to detect an oscillation characteristic of the oscillating element; and a control unit configured to, in a case of cleaning the orifice, drive the oscillating element at a drive period based on a detection result of the detection unit in a state in which the liquid is retained between the retention member and the ejection surface, wherein the oscillating element is a piezoelectric element configured to be driven by supply of a drive signal so as to generate energy for causing a liquid to be ejected from the orifice, wherein the control unit is configured to drive the piezoelectric element by a different number of drive signals per unit time between in a case of causing a liquid to be ejected from the orifice onto an ejection target and in a case of cleaning the orifice, and wherein a waveform of the drive signal is a trapezoidal wave, a square wave, a saw wave, or a triangular wave.

9. An imprint apparatus comprising a liquid ejecting apparatus and operable to perform an imprint process on a substrate by ejecting liquid from the liquid ejecting apparatus, wherein the liquid ejecting apparatus comprises:

an ejection unit including an ejection surface in which an orifice through which a liquid is ejected is open;

an oscillating element provided with the orifice;

a retention member arranged opposite the ejection surface and configured to retain a liquid between the retention member and the ejection surface;

a detection unit configured to detect an oscillation characteristic of the oscillating element; and a control unit configured to identify a natural period of the oscillating element based on a detection result, and configured to, in a case of cleaning the orifice, drive the oscillating element at a drive period based on the natural period in a state in which the liquid is retained between the retention member and the ejection surface, wherein letting the natural period be T and the drive period be Td, $$T \leq Td \leq T \times 1.2.$$

* * * * *